(12) United States Patent
Osborne et al.

(10) Patent No.: US 10,288,185 B2
(45) Date of Patent: May 14, 2019

(54) VALVE ASSEMBLY

(71) Applicants: Lawrence Osborne, Acton, CA (US);
Joshua Terry Prather, Acton, CA (US)

(72) Inventors: Lawrence Osborne, Acton, CA (US);
Joshua Terry Prather, Acton, CA (US)

( * ) Notice: Subject to any disclaimer, the term of this patent is extended or adjusted under 35 U.S.C. 154(b) by 63 days.

(21) Appl. No.: 15/703,791

(22) Filed: Sep. 13, 2017

(65) Prior Publication Data

US 2018/0094739 A1    Apr. 5, 2018

Related U.S. Application Data

(60) Provisional application No. 62/403,041, filed on Sep. 30, 2016.

(51) Int. Cl.
| | |
|---|---|
| *F16K 27/04* | (2006.01) |
| *F16K 11/07* | (2006.01) |
| *E21B 34/08* | (2006.01) |
| *F16K 31/122* | (2006.01) |
| *E21B 34/14* | (2006.01) |
| *F16K 11/10* | (2006.01) |
| *E21B 43/12* | (2006.01) |

(52) U.S. Cl.
CPC ............ *F16K 27/041* (2013.01); *E21B 34/08* (2013.01); *E21B 34/14* (2013.01); *F16K 11/0716* (2013.01); *F16K 11/105* (2013.01); *F16K 31/1221* (2013.01); *E21B 43/126* (2013.01)

(58) Field of Classification Search
CPC ............... F16K 27/041; F16K 11/0716; F16K 31/1221; E21B 34/14; E21B 34/08
See application file for complete search history.

(56) References Cited

U.S. PATENT DOCUMENTS

| | | | |
|---|---|---|---|
| 6,125,930 A | 10/2000 | Moyes | |
| 6,289,990 B1 | 9/2001 | Dillon et al. | |
| 8,453,749 B2* | 6/2013 | Vick, Jr. et al. | E21B 23/04 166/319 |
| 9,027,654 B2* | 5/2015 | Osborne | E21B 34/08 166/373 |
| 10,041,329 B2* | 8/2018 | Osborne | E21B 34/08 |
| 2010/0282476 A1 | 11/2010 | Tessier et al. | |
| 2015/0184487 A1 | 7/2015 | Osborne | |

FOREIGN PATENT DOCUMENTS

EP    1260671 B1    9/2004

\* cited by examiner

*Primary Examiner* — Kevin Lee
(74) *Attorney, Agent, or Firm* — Paul D. Chancellor; Ocean Law

(57) ABSTRACT

A valve with a shuttle for use in a flow management system is capable of bypassing a backflow.

2 Claims, 6 Drawing Sheets

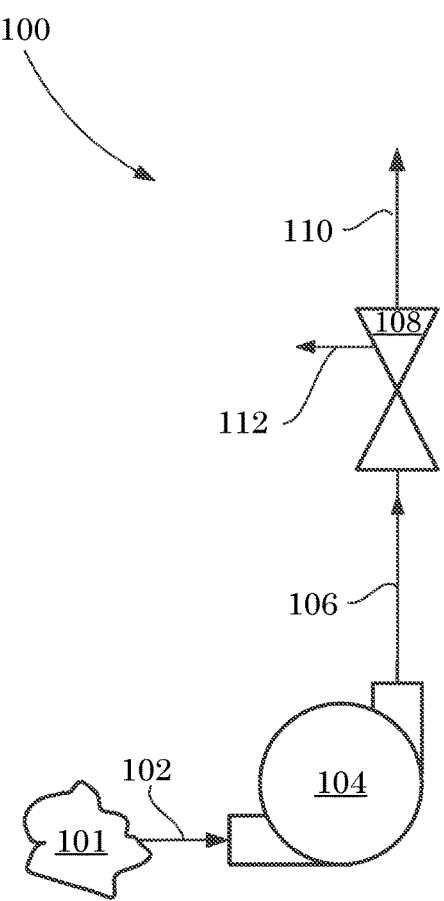
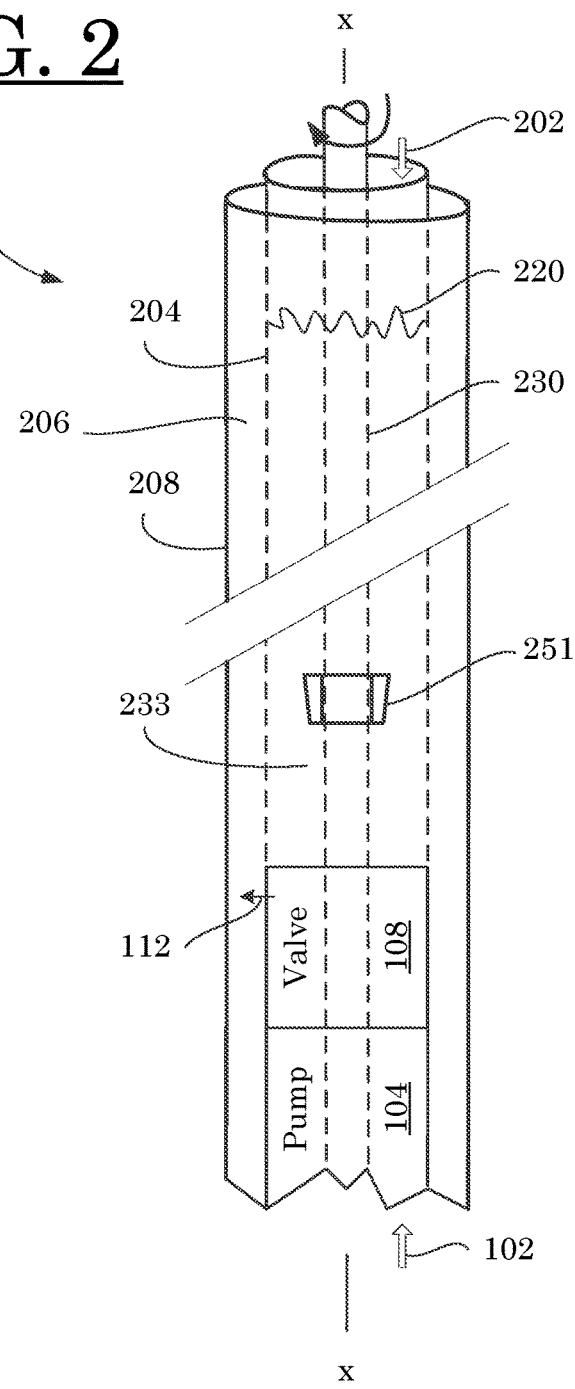
FIG. 1
FIG. 2

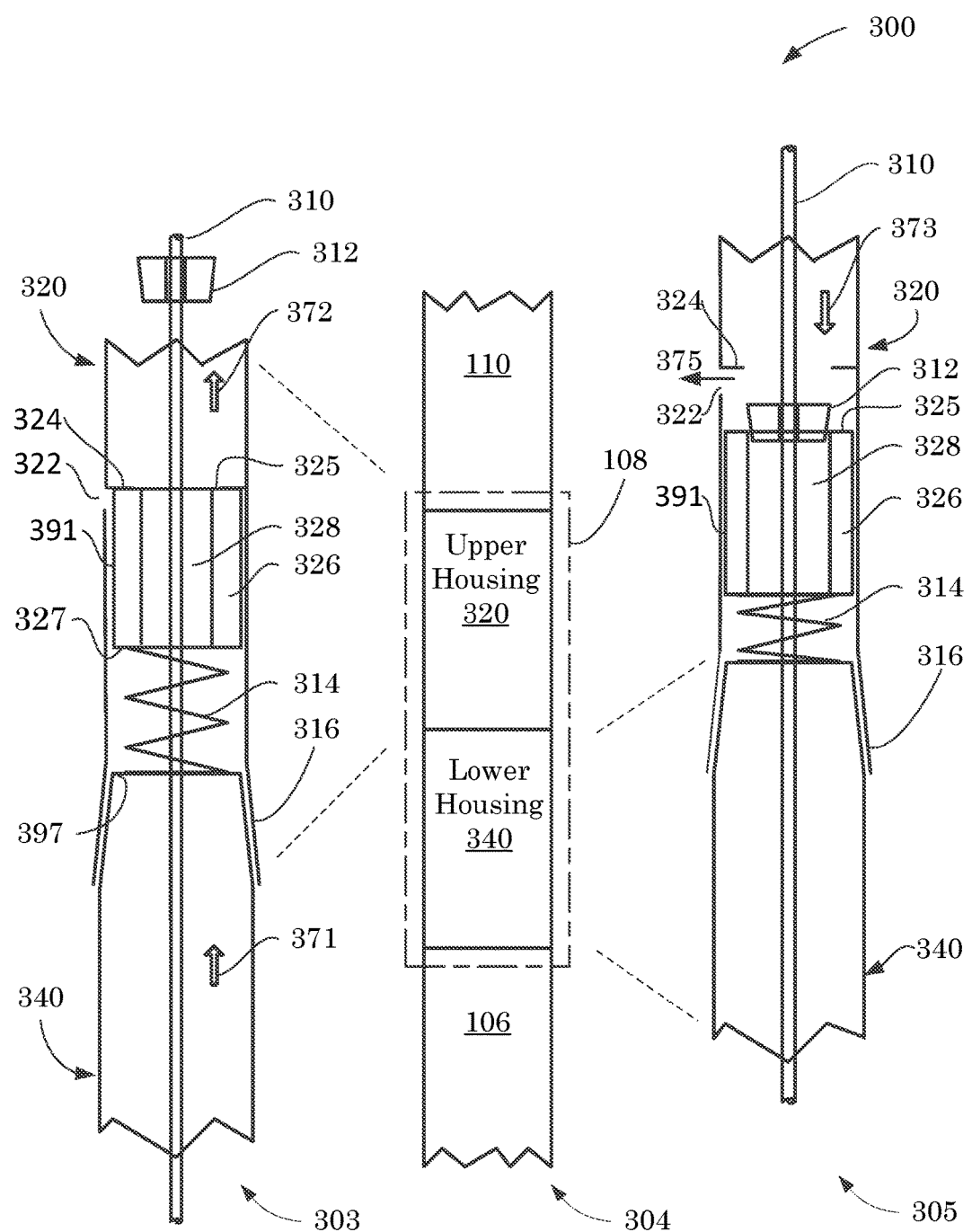

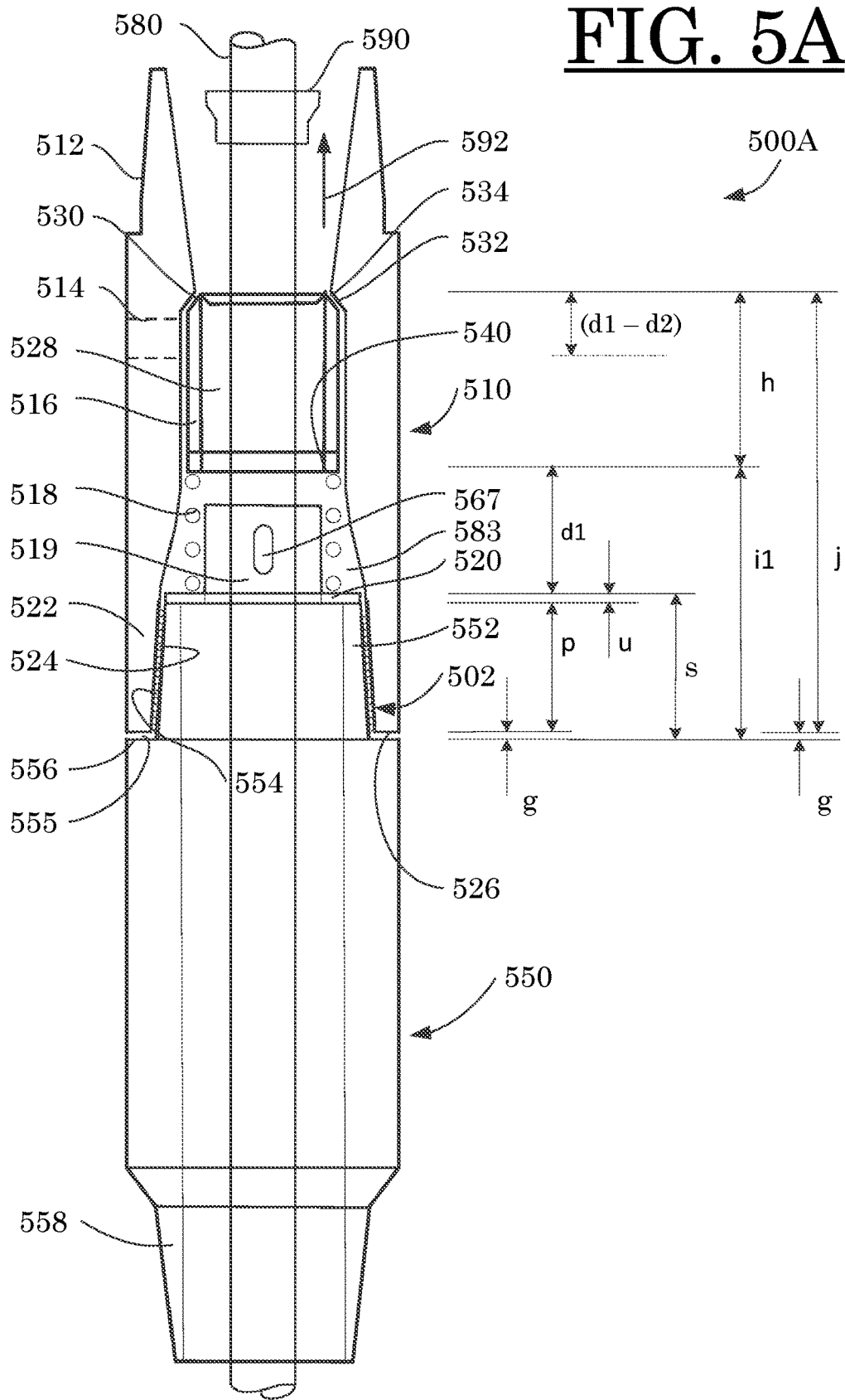

VALVE ASSEMBLY

PRIORITY CLAIM AND INCORPORATION BY REFERENCE

This application claims the benefit of U.S. Provisional Patent Application No. 62/403,041 filed Sep. 30, 2016 entitled IMPROVED VALVE ASSEMBLY.

BACKGROUND OF THE INVENTION

Field of the Invention

The present invention relates to fluid flow components and systems using those components. In particular, the present invention relates to an improved valve assembly used in fluid flow systems. Intended uses of the valve further include use of the valve assembly in a downhole production string.

Discussion of the Related Art

Pumps and valves located in hard to reach places present maintenance and maintenance downtime issues. Where pumps and valves are used to produce a natural resource such as a hydrocarbon, downtime can result in lost production and increased expenses for workmen and materials.

In particular, downhole production strings including pumps and valves for managing and lifting fluids, such as particulate laden liquids and slurries, present a maintenance problem. Here, both pumps and valves can lose capacity and in cases be rendered inoperative when conditions including fluid conditions and fluid velocities fall outside an intended operating range. Such unintended operating conditions can foul, plug, and damage equipment, for example sanding up of a pump.

Despite the industry's resistance to change, there remains a need to improve production strings.

SUMMARY OF THE INVENTION

The present invention includes a valve with a shuttle that is useful in flow management systems.

In an embodiment a valve assembly for use in a flow management system comprises: a spring biased shuttle within a valve body through hole and coaxially arranged for translating along a through hole axis; the valve body including an upper housing and a lower housing; the upper housing having a box end with a box end face, a tapered internal thread, an internal nose, and a sidewall spill port below the nose; the lower housing having a pin end with a tapered external thread, the thread extending between a pin face and a pin shoulder and engaging the box end thread; a shuttle upper end for selectively engaging the nose and a shuttle skirt for selectively blocking the sidewall port; and, a spring upper end for engaging the shuttle or a structure that extends from the shuttle; and, a spring lower end for engaging the pin end or a structure that extends from the pin end; wherein the shoulder is located such that when a gap between the shoulder and the box face is closed during valve assembly, substantially simultaneous occurrences include (i) the spring is pre-compressed to exert a force on the shuttle, the force consistent with forward flow through the valve during valve operation, (ii) penetration of the pin threads into the box threads provides an interference fit and a seal therebetween, and (iii) the shuttle is free to travel a distance toward the lower housing that unblocks the spill port, the travel consistent with reverse flow through the valve during valve operation.

In an embodiment, a valve body includes a spill port and a shuttle is located in a chamber of the valve body. The shuttle has a through hole extending between a shuttle closure end and a shuttle spring end. A first seat and a first seat closure are located in the through hole. Second and third seats are located in the valve body chamber and second and third seat closures are located on the shuttle closure end. A spring is located substantially between the shuttle spring end and a fixture coupled to the valve body. The valve is operable to pass a flow entering the through hole at the shuttle spring end and to spill a flow that closes the first seat closure. In some embodiments, the circumference of the second seat is greater than the circumference of the third seat and the circumference of the shuttle spring end is more than two times greater than the circumference of the third seat.

In an embodiment, a valve body includes a spill port and a shuttle located in a chamber of the valve body. The shuttle has a through hole extending between a shuttle closure end and a shuttle spring end. A valve center line is shared by the valve body and the shuttle. A first seat is located on a first face of the shuttle and there is a first seat closure. The first seat closure has a central bore for accepting a rotatable shaft extending through the valve body and the first seat closure is for translating along the rotatable shaft. A second seat is located in the valve body chamber and a second seat closure is located on a second face of the shuttle. A spring is located substantially between the shuttle spring end and a valve body support. The valve is operable to pass a flow entering the through hole at the shuttle spring end and to spill a flow that closes the first seat closure.

BRIEF DESCRIPTION OF THE DRAWINGS

The present invention is described with reference to the accompanying figures. These figures, incorporated herein and forming part of the specification, illustrate embodiments the invention and, together with the description, further serve to explain its principles enabling a person skilled in the relevant art to make and use the invention.

FIG. 1 is a schematic diagram of a valve assembly in a flow management system in accordance with the present invention.

FIG. 2 is a schematic diagram the valve assembly of FIG. 1.

FIG. 3 shows an embodiment of the valve assembly of FIG. 1.

FIGS. 5A-C show another embodiment of the valve assembly of FIG. 1.

DETAILED DESCRIPTION OF THE PREFERRED EMBODIMENTS

Figure 4A:
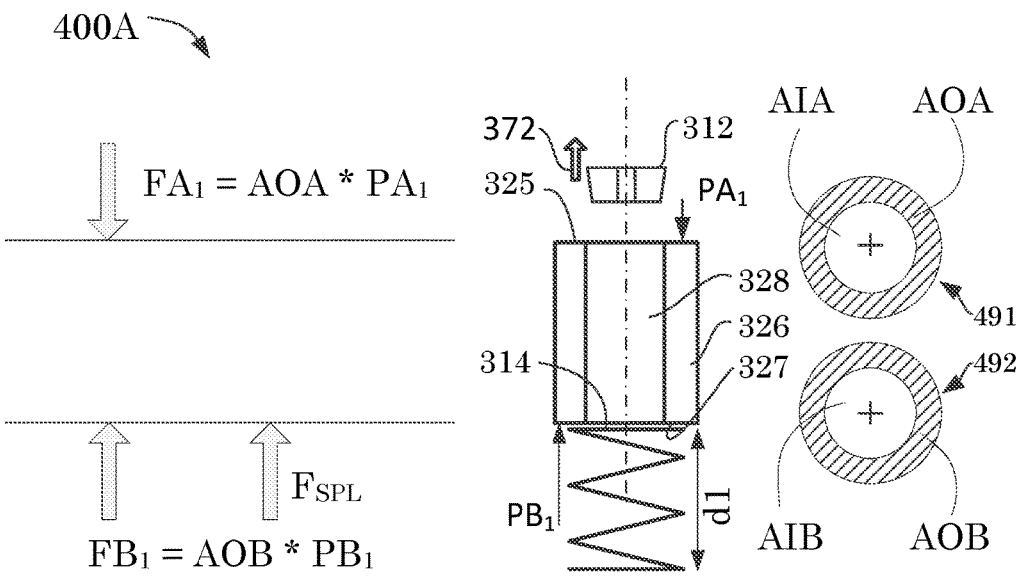
FIGS. 4A-B show diagrams of forces on the shuttle of the valve of FIG. 3.

The disclosure provided in the following pages describes examples of some embodiments of the invention. The designs, figures, and description are non-limiting examples of certain embodiments of the invention. For example, other embodiments of the disclosed device may or may not include the features described herein. For example, the disclosed embodiments do not limit the number of constituting components, the materials thereof, the shapes thereof, or the relative arrangement thereof. Moreover, disclosed advantages and benefits may apply to only certain embodiments of the invention and should not be used to limit the disclosed invention.

It is noted that, as used in this specification and the appended claims, the singular forms "a", "an" and "the" include plural referents, unless the context clearly dictates otherwise.

To the extent parts, components and functions of the described invention exchange materials such as fluids, the associated interconnections and couplings may be direct or indirect unless explicitly described as being limited to one or the other. Notably, indirectly connected parts, components, and functions may have interposed devices and/or functions known to persons of ordinary skill in the art.

FIG. 1 shows an embodiment of the invention 100 in the form of a schematic diagram. A bypass valve 108 is interconnected with a pump 104 via a pump outlet 106. The pump includes a pump inlet 102 taking suction from a reservoir 101 such as a hydrocarbon or oil reservoir. The valve includes a valve outlet 110 and a valve spill port 112. In various embodiments, the inlets, outlets and ports are one or more of a fitting, flange, pipe, or similar fluid handling part or conveyance.

FIG. 2 shows a section of a downhole production string 200. The production string includes a bypass valve 108 that is an embodiment of a valve of the present invention. The bypass valve 108 is interposed between a pump 104 and an upper tubing string or flow tube 204 for containing a valve bobbin 251 that translates along a rotatable pump operating rod 230, for example a rod turning a pump rotor. In some embodiments, a casing 208 surrounds one or more of the tubing string, valve, and pump. Here, an annulus 206 is formed between the tubing string and the casing. A production or forward flow is indicated by an arrow 102 while a reverse or back flow is indicated by an arrow 202. In various embodiments, the bypass valve serves to isolate backflows from one or more of the valve, portions of the valve, and the pump.

It is noted that during operation of the pump 104, the annulus 233 between the pump rod 230 and the tubing 204 is filled with fluid during a forward flow 102 away from the pump. Similarly, when the pump ceases to operate or is impaired, fluid fills this inner annulus until, for example, it is drained out as by the valve spill port 112 during a reverse flow 202. And, when fluid is spilled, it may be spilled into an outer annulus 206 between a casing 208 and the tubing 204, for example for return to the reservoir 101.

FIG. 3 shows views of a bypass valve assembly 300. A schematic view at center 304 shows, between a pump outlet 106 and a valve outlet 110, a bypass valve 108. The bypass valve includes an upper body or housing 320 with a spill port 112 for coupling to the valve outlet 110 and a lower body 340 or housing for coupling to the pump outlet.

A schematic view at left 303 shows the valve upper body 320 mated with the valve lower body 340 at an interconnection 316. Within the upper body 320 is a shuttle 326 and below the shuttle is biasing member such as a spring or coil spring 314. The biasing member may be located substantially between or between the shuttle and the lower body and the spring may be operable to transfer a force tending to move the shuttle away from the lower valve body. In an embodiment the spring touches a shuttle lower or spring end 327 and the spring is supported from the lower valve body, for example by bearing on the lower valve body.

Movement of the shuttle serves to block an upper body spill port 322 via a shuttle skirt 391 (as shown) or otherwise directly or indirectly. For example, when a shuttle upper end 325 rests on a stop 324 which may extend from the upper valve body interior, the shuttle covers the spill port. In some embodiments there is an intermediate spring rest. In some embodiments the spring rests on or is supported by a lower pin end 397. Notably, the shuttle has a through hole 328 such that fluid may pass between the upper and lower valve bodies 320, 340 via the shuttle when the shuttle through hole is not blocked.

In various embodiments, a pump rotatable driving rod 310 originates above the well for operating a downhole pump. As shown, the rod passes through a bobbin 312 that is free to translate along a length thereof. Skilled artisans will appreciate that the bobbin is normally suspended above the shuttle 326 by moving fluid traveling from the pump 371, through the production string 372, and to a surface location. As is explained further below, loss of sufficient suspension flow causes the bobbin to fall and block the shuttle through hole 328.

A schematic view at right 305 shows the valve lower body 340 mated with the valve upper body 320 at the interconnection 316. Here, a reduction of flow 372 followed by a flow reversal 373 causes the bobbin 312 to fall, blocks the shuttle 326 through hole 328, moves the shuttle to compress the spring 314, and unblocks the spill port 322 such that a spill port flow 375 leaves the valve. For example, spill port flow leaves the valve and enters the casing/tubing annulus 206 for return to the reservoir 101.

Figure 4B:
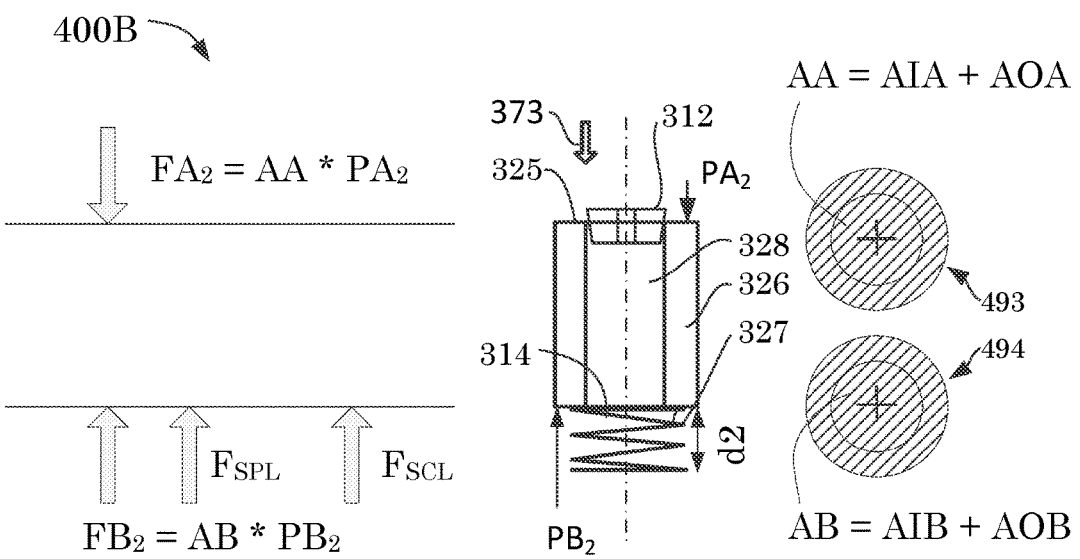

FIGS. 4A-B show forces acting on a valve shuttle 400A-B.

FIG. 4A shows a shuttle 326 when the bobbin 312 is lifted by flow 372 away from the shuttle. In this condition, balanced upward and downward forces act on the shuttle.

To the right of the shuttle 326, top and bottom views 491, 492 are shown. Because the through hole 328 is not blocked by the bobbin 312, the shuttle presents top and bottom views 491, 491 with central openings AIA, AIB. Annular areas surrounding the openings are AOA, AOB.

The downward forces acting in the shuttle include a downward force $FA_1 = AOA * PA_1$ due to pressure $PA_1$ at time 1 acting on upper annular shuttle area AOA. Notably, area AOA encircles area AIA where AIA is a cross-sectional area of the shuttle through hole 328.

The upward forces acting on the shuttle include an upward force $FB_1$ and an upward force $F_{SPL}$. Upward force $FB_1 = AOB * PB_1$ results from pressure $PB_1$ at time 1 acting on lower annular shuttle area AOB. Notably, to the extent the shuttle and its through hole 328 have constant cross sectional areas and/or diameters, AOA=AOB and AIA=AIB.

Upward force $F_{SPL}$ results from the spring 314 pushing the shuttle 326 away from the valve lower body 340. Here, $F_{SPL}$ is a spring pre-load or pre-compression tending to push the shuttle upward even when the shuttle upper end 325 rests against the stop 324 (See e.g., FIG. 3). The spring pre load may be estimated as a spring constant "k" multiplied by a spring displacement "d" where d equals a spring free length dfl less a spring actual length d1. For example, a compression spring with k=100 lbf/inch provides a 100 pound force when compressed a distance of 1.0 inches.

FIG. 4B shows a shuttle 326 after the bobbin 312 falls and blocks the shuttle 326 through hole 328 and after the shuttle is pushed away from the spill port 322 (See 305 of FIG. 3). In this condition, upward and downward forces act on the shuttle.

To the right of the shuttle 326, top and bottom views 493, 494 are shown. Because the through hole 328 is blocked by the bobbin 312, the shuttle top view presents an area AA=AIA+AOA and the bottom view presents an area AB=AIB+AOB.

The downward forces acting in the shuttle include a downward force $FA_2=AA*PA_2$ due to pressure $PA_2$ at time 2 acting on the blocked shuttle area AA=AIA+AOA.

The upward forces acting on the shuttle include upward forces $FB_2$, $F_{SPL}$, and $F_{SCL}$. Upward force $FB_2=AB*PB_2$ results from pressure PB2 at time 2 acting on blocked shuttle area AB=AIB+AOB.

Upward force $F_{SPL}$ results from the spring 314 pushing the shuttle 326 away from the valve lower body 340. Here, $F_{SPL}$ is a spring pre-load or pre-compression tending to push the shuttle upward even when the shuttle upper end 325 rests against the stop 324.

Upward force $F_{SCL}$ results from the spring 314 pushing the shuttle 326 away from the valve lower body 340. Here, $F_{SCL}$ is a spring force tending to push the shuttle upward. The spring force may be estimated as a spring constant "k" multiplied by a spring displacement d=(d1−d2) where d1 is the spring pre-compressed length and d2 is the shorter spring length following spring compression by the shuttle 326.

In an embodiment, a valve with nominal diameter of about 3½ inches includes a spring of about 4 inches in free length with a pre-compression of about 1 inch yielding a pre-compression force of about 2180 pounds. In an embodiment, a valve with nominal diameter 2⅞ inches includes a spring of about 4 inches in free length with a pre-compression of about 1 inch yielding a pre-compression force of about 2070 pounds. Notably, in various embodiments the spring constant k (pounds force per inch of deflection) may vary in a range of about −50 to +50 percent. And, in various embodiments a proportional multiple of k may be used to estimate a new k value when valve size changes.

Figure 5B:
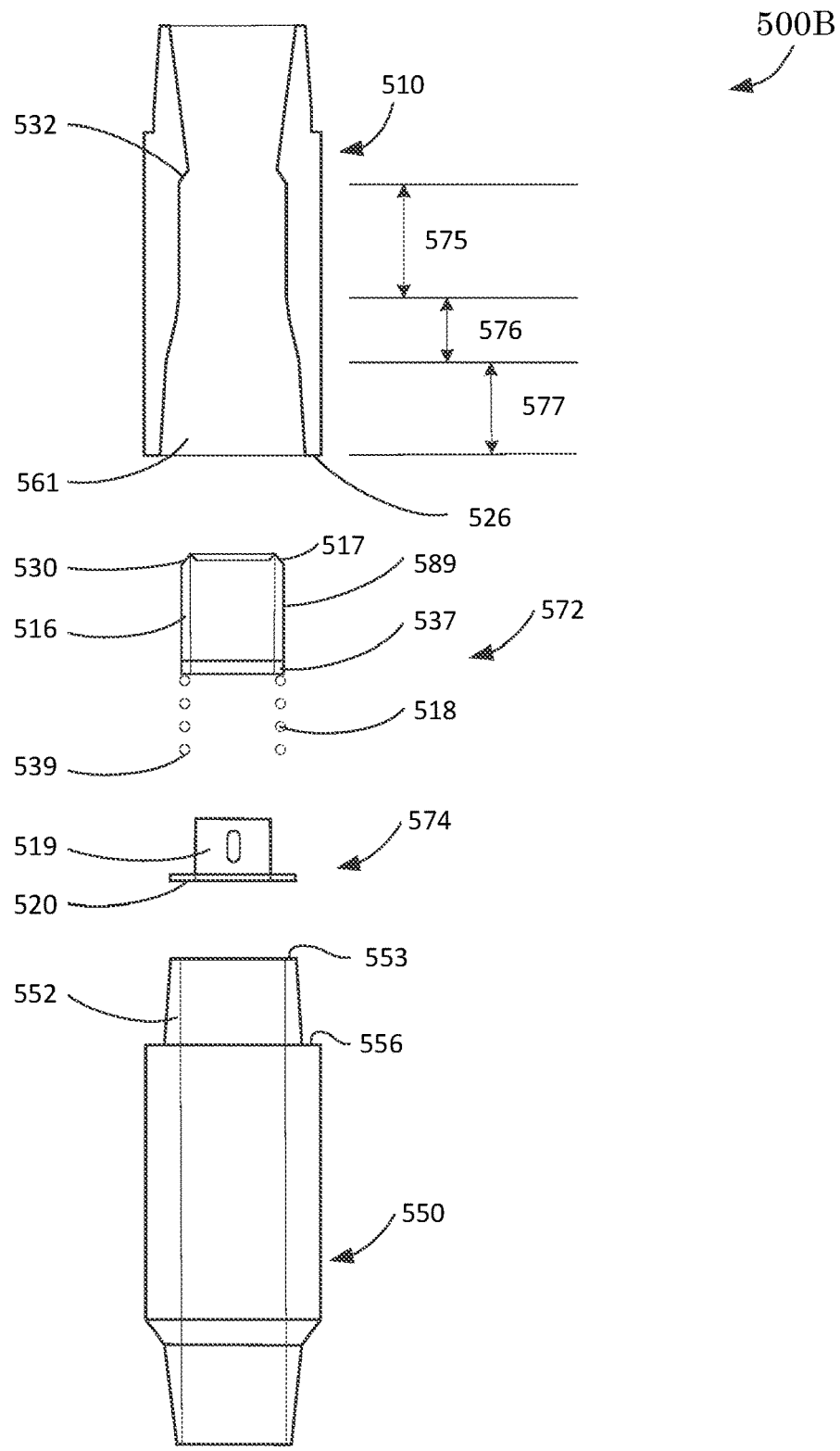
Figure 5C:
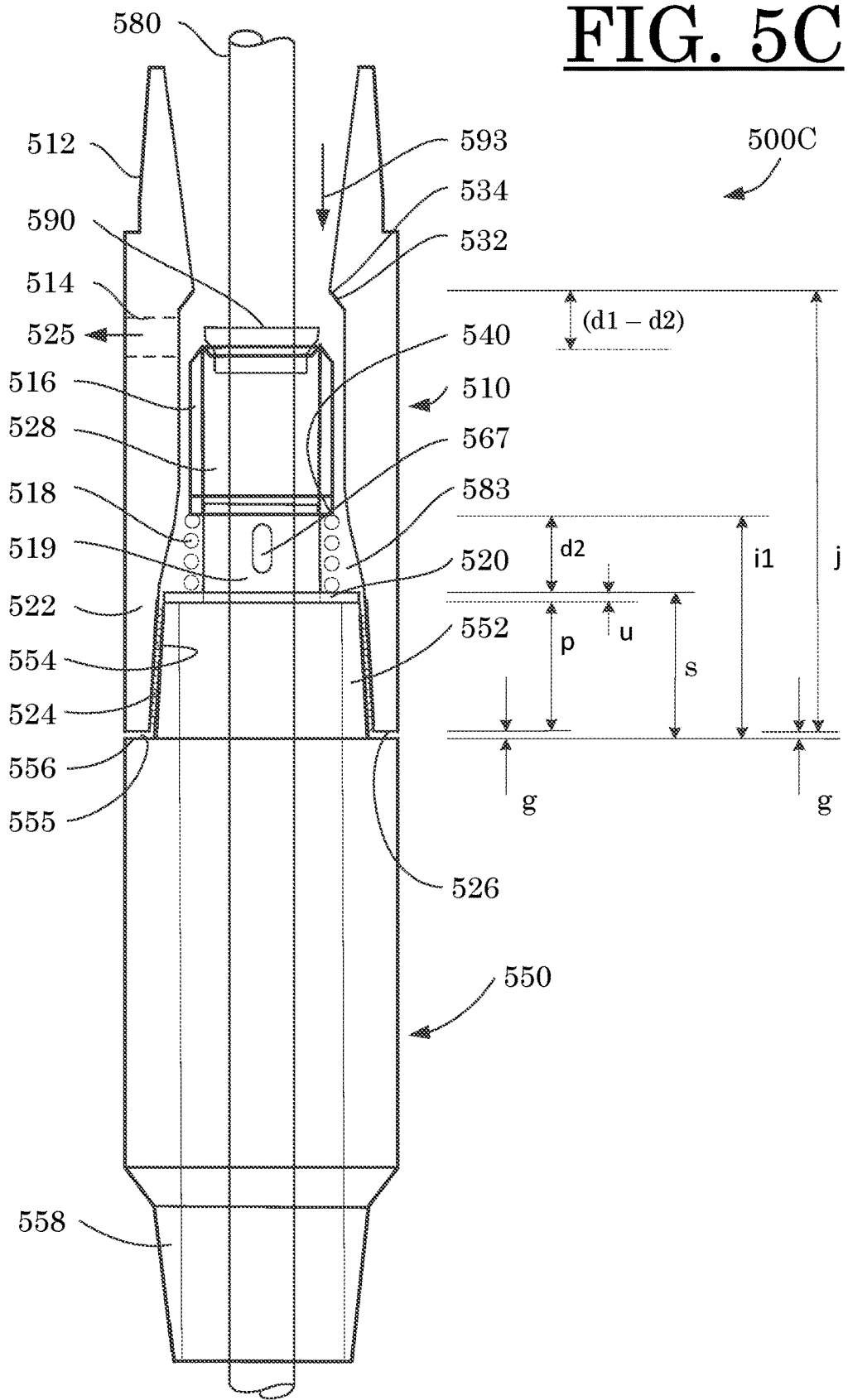

FIGS. 5A-C show another bypass valve assembly 500A-C.

FIG. 5A shows a valve bobbin 590 slidably engaging a rotatable pump rod 580, the bobbin lifted above a shuttle 516 as by pumped forward flow 592, the shuttle through hole 528 unblocked, and the shuttle located to block a valve spill port 514. In this forward flow state a valve spring 518 may be pre-compressed between the shuttle and a spring rest 520. For example, a pre-compressed spring length d1 may be less that a free spring length dfl.

An upper valve body 510 interconnects with a lower valve body 550 via an externally threaded 554 lower valve body pin end 552 and an internally threaded 524 upper valve body box end 522 at a valve joint 502. In various embodiments, a tapered thread connection is used where the threads are one or more of American Petroleum Institute ("API") threads, round threads, 8 round threads, and/or threads on upset or non-upset parts. For example, in an embodiment the valve joint is a 4 inch non-upset 8 round threaded connection. For example, in an embodiment the valve joint is a 3.5 inch non-upset 10 round threaded connection.

Applicant notes that in API connections the threads of the pin and box are cut along conforming taper cones and the thread form is commonly referred to as a tapered thread. In joining the pin and box components together, the tapered pin wedges into the tapered box as the pin threads are rotated into the box threads. Wedging the pin into the box produces a radial bearing pressure between the two components. The bearing pressure, and thus the sealing capability of the connection, is increased as the pin advances into the box. Connections of this type are termed interference fits which primarily distinguishes them from premium connections that employ parallel threads and metal-to-metal shoulder engagement for achieving a seal.

As skilled artisans will appreciate, tapered thread designs provide for an observed joint make up torque and/or thread visibility (e.g., hidden or visible) to assure that the joint is sealed and to assure that the joint is not subject to separation as by being unscrewed during use. Typically, torque increases with penetration of pin end threads into a threaded box end wherein the deeper the penetration, the greater the torque. Similarly, as more pin end threads are rotated into and hidden within the box end, more torque is required to achieve further advances.

Notably, tapered threads designed for interference fits are particularly subject gauling, cracking, and changing shape. One or more of these deformations may occur when pin thread penetration into a box is sufficient to overstress the pin and/or box threads. As such, precautions must be taken to limit pin thread penetration into the threads of a mating box end.

Turning again to valve components, some embodiments of the valve 500A may include an upper body upper threaded pin end 512 and some embodiments may include a lower body lower threaded pin end 558. Some embodiments may include a spring guide 519 extending from the lower valve body 550 and some spring guides may include a flush port 567 such that action of the spring flushes a spring space via flow through the port.

Within a central cavity 583 of the joined valve bodies 510, 550, i) the shuttle 516 having, ii) the coil spring 518, and iii) the spring rest 520 are coaxially located about a valve centerline x-x. In the example shown, the shuttle 516 upper end 530 mates with an upper valve body nose 532 to block the spill port 514 via a nose seal 534 formed above the spill port 514. As skilled artisans will appreciate, other arrangements such as a separable nose part might be used in forming the nose seal.

Dimensions of interest in one or more embodiments include those shown in the table below.

| Dimension | Dimension Description |
|---|---|
| g | Gap (distance, if any, between lower valve housing shoulder and upper valve housing end face) |
| p | Insertion length as explained below |
| s | Lower valve body pin thread length |
| d1 | Long spring length (as when the shuttle is stopped by the nose as in forward flow) |
| d2 | Short spring length (as when the shuttle compresses the spring as in reverse flow) |
| h | Shuttle length |
| i1 | Long shuttle offset (length from lower valve housing shoulder to bottom of shuttle, as in forward flow state) |
| i2 | Short shuttle offset (length from lower valve housing shoulder to top of shuttle, as in reverse flow state) |
| j | Length from nose to box end face. |
| u | Thickness of spring rest |

Spring length d1 is a measure of the spring 518 length along the longitudinal axis x-x. When the shuttle 516 seals against the nose 532 in the shuttle uppermost position, the spring length d1 may be a maximum spring length determined by the distance between a shuttle base 540 and the spring rest 520.

As skilled artisans will appreciate, some embodiments provide a forward flow 592 spring length that is a maximum spring length d1. This maximum spring length may select a particular spring pre-compression force. And, as seen, this maximum spring length may be varied according to the engaged length of the pin and box threads 554, 524 e.g., the penetration of the threaded pin into the box. Notably, spring length may be reduced until a pin shoulder 556 abuts a box face 526.

Where d1 is the distance separating the shuttle 516 and the spring rest 520, maximum shuttle travel is reduced as spring length is reduced. Further, the degree to which the shuttle blocks the spill port 514 may vary with d1.

Where the pin shoulder 556 is separated from the box face 526, there a gap 555 with dimension "g" such that further engagement of the threads may be possible until the gap is closed. Conversely, when the gap is closed, further engagement of the threads may be precluded or substantially precluded (only a partial rotation is available) such that spring pre-compression is a maximum value and/or spring length d1 is a minimum value.

In an embodiment, the lower valve body has a pin thread length "s" about parallel to the longitudinal axis x-x where s g+p, where g is the gap dimension mentioned above and where p an insertion length of the pin 552 into the box 522. As will be appreciated by skilled artisans, longer penetration or insertion lengths increase the lengths of engaged threads 554, 524 and further compress the spring 518 as d1 is reduced. In some embodiments the upper valve body has a box thread length "s" parallel to the longitudinal axis x-x.

FIG. 5B is an exploded diagram of selected parts of the valve of FIG. 5A. Valve upper housing 510 includes an entry 561 leading to a threaded mount 577. Adjoining the threaded mouth is a throat which may be a converging throat 576 and a cylinder 575 which may be a cylinder of constant internal diameter. Above the cylinder is the internal nose 532 and below the nose is the spill port 514.

For insertion within the valve is a spring biased shuttle 572 including a shuttle 516 having a skirt 589 and a spring 518. In some embodiments, a spring plate such as an annular spring plate 537 may be located between and/or interengaged with the spring and the shuttle. In an embodiment, the spring plate projects from the shuttle.

Valve lower housing 550 includes a pin end 552 having a pin end face 553 and a pin end shoulder 556. In some embodiments tapered threads extend between the pin end face and the pin end shoulder.

In some embodiments, the spring lower end 539 rests directly on the lower housing pin end 552. And in some embodiments the spring lower end 539 rests on a spring rest 520 supported by the pin end. And some embodiments include a spring guide 519 that is encircled by the spring 518. The spring guide may extend from one or both of the pin end and the spring rest. And in some embodiments an integral spring rest 574 includes the spring rest 520 and the spring guide 519.

In an embodiment, valve assembly procedure includes inserting the shuttle and spring within the upper valve housing and advancing the pin end 552 as via threads into the threaded mouth 577 so as to compress the spring between the shuttle 516 and the lower housing 550.

Notably, in some embodiments the shoulder 556 is located such that when a gap (see e.g., 555 of FIG. 5A) between the shoulder and the box face is closed during valve assembly, there are substantially simultaneous occurrences. These occurrences may include one or more of or all of (i) the spring is pre-compressed to exert a force on the shuttle, the force consistent with forward flow through the valve during valve operation, (ii) penetration of the pin threads into the box threads provides an interference fit and a seal therebetween, and (iii) the shuttle is free to travel a distance toward the lower housing that unblocks the spill port, the travel consistent with reverse flow through the valve during valve operation. As used here, substantially simultaneously refers to these occurrences taking place just before the gap is closed and/or during advancement of the pin end 552 into the box end 522 while the shoulder 556 is in contact with the box face 526.

And, notably, in some embodiments the shoulder 556 is located such that when a gap (see e.g., 555 of FIG. 5A) between the shoulder and the box face is closed during valve assembly, there are simultaneous occurrences. These occurrences include all of (i) the spring is pre-compressed to exert a force on the shuttle, the force consistent with forward flow through the valve during valve operation, (ii) penetration of the pin threads into the box threads provides an interference fit and a seal therebetween, and (iii) the shuttle is free to travel a distance toward the lower housing that unblocks the spill port, the travel consistent with reverse flow through the valve during valve operation. As used here, simultaneously refers to these occurrences taking place just as the gap is closed and the shoulder 556 rubs against the box face 526. Such a shoulder 556 may referred to as a triple alignment shoulder.

FIG. 5C shows the valve of FIG. 5A with the bobbin 590 slidably engaging the rotatable pump rod 580 and the bobbin 590 blocking a shuttle mouth 517 as during a reverse flow 593 that is spilled 525 from the spill port 514.

In this reverse flow state, the valve spring 518 may be compressed by movement of the shuttle that squeezes the spring between the shuttle and a spring rest 520 (See also FIG. 4B). For example, a compressed spring length d2 of FIG. 5C is less that a pre-compressed spring length d1 of FIG. 5A due to downward motion of the shuttle toward the lower valve housing 550.

Downward motion of the shuttle results when the reverse flow 593 causes the bobbin 590 to block the shuttle 516 through hole 528 and pressure from a fluid column 220 above the shuttle forces the shuttle toward the spring rest 520. As skilled artisans will appreciate, when forces acting on the shuttle are not balanced (see also e.g., FIGS. 4A-B), the shuttle tends to move to until the forces are balanced.

For example, while there is a forward flow 592 lifting the bobbin 590, forces tending to push the shuttle down are overcome by forces, including spring force, pushing the shuttle up (see also e.g., FIG. 4A).

For example, when there is a reverse flow 593 or a transition to a reverse flow, the forces tending to push the shuttle up, including the spring force, are overcome by forces pushing the shuttle down (see also e.g., FIG. 4B). This increase in downward force on the shuttle 516 occurs when the bobbin 580 falls and blocks the shuttle 516 through hole 528 such that fluid column pressure above the shuttle acts on a larger area presented by the blocked top of the shuttle and causes a larger downward force on the shuttle. In response the shuttle moves toward the lower housing 550, unblocks the spill port 514, and allows a spilled flow 525 to leave the spill port.

While various embodiments of the present invention have been described above, it should be understood that they have been presented by way of example only, and not limitation. It will be apparent to skilled artisans that various changes in the form and details can be made without departing from the spirit and scope of the invention. As such, the breadth and scope of the present invention should not be limited by the above-described examples, but should be defined only in accordance with the following claims and equivalents thereof.

What is claimed is:

1. A valve for use in a flow management system comprising:
- a spring biased shuttle within a valve body through hole and coaxially arranged for translating along a through hole axis;
- the valve body including an upper housing and a lower housing;
- the upper housing having a box end with a box end face, a tapered internal thread, an internal nose, and a sidewall spill port below the nose;
- the lower housing having a pin end with a tapered external thread, the thread extending between a pin face and a pin shoulder and engaging the box end thread;
- a shuttle upper end for selectively engaging the nose and a shuttle skirt for selectively blocking the sidewall port;
- a spring upper end for engaging the shuttle or a structure that extends from the shuttle; and,
- a spring lower end for engaging the pin end or a structure that extends from the pin end;
- wherein the shoulder is located such that when a gap between the shoulder and the box face is closed during valve assembly, substantially simultaneous occurrences include (i) the spring is pre-compressed to exert a force on the shuttle, the force consistent with forward flow through the valve during valve operation, (ii) penetration of the pin threads into the box threads provides an interference fit and a seal therebetween, and (iii) the shuttle is free to travel a distance toward the lower housing that unblocks the spill port, the travel consistent with reverse flow through the valve during valve operation.

2. A method of utilizing a triple alignment shoulder to properly assemble a valve including a bifurcated valve housing, the method including the steps of:
- providing an upper valve housing with an internal nose seal and a spill port below the nose seal;
- inserting a shuttle and a spring in the upper valve housing;
- providing a lower housing with a pin end having an external tapered thread and locating a triple alignment shoulder adjacent to the last thread; and,
- initially engaging the upper housing and the lower housing via an upper housing box end having threads mated with the lower housing pin end;
- wherein rotating the pin end into the box end closes a gap between the triple alignment shoulder and a face of the box end and results in simultaneous occurrences including i) achieving a desired torque value sufficient to seal between the upper and lower housings, ii) compressing the spring to force the shuttle against the nose with a force consistent with forward flow through the valve, and iii) fixing a shuttle travel distance for selectively blocking the spill port consistent with reverse flow through the valve.

* * * * *